(12) United States Patent
Ashraf et al.

(10) Patent No.: US 10,869,290 B2
(45) Date of Patent: Dec. 15, 2020

(54) METHODS, DEVICE AND NODE FOR ADAPTING A NUMEROLOGY DEPENDING ON A POSITION OF A WIRELESS DEVICE

(71) Applicant: TELEFONAKTIEBOLAGET LM ERICSSON (PUBL), Stockholm (SE)

(72) Inventors: Shehzad Ali Ashraf, Aachen (DE); Gustav Wikström, Täby (SE); Ismet Aktas, Neuss (DE); Joachim Sachs, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/475,679

(22) PCT Filed: Dec. 20, 2017

(86) PCT No.: PCT/IB2017/058226
§ 371 (c)(1),
(2) Date: Jul. 2, 2019

(87) PCT Pub. No.: WO2018/127761
PCT Pub. Date: Jul. 12, 2018

(65) Prior Publication Data
US 2019/0349878 A1 Nov. 14, 2019

Related U.S. Application Data

(60) Provisional application No. 62/443,518, filed on Jan. 6, 2017.

(51) Int. Cl.
*H04W 56/00* (2009.01)
*H04L 1/00* (2006.01)
(Continued)

(52) U.S. Cl.
CPC ....... *H04W 56/0045* (2013.01); *H04L 1/0009* (2013.01); *H04L 5/0007* (2013.01);
(Continued)

(58) Field of Classification Search
CPC ............... H04L 5/0007; H04L 5/0053; H04W 28/0268; H04W 56/0045; H04W 72/0446
See application file for complete search history.

(56) References Cited

U.S. PATENT DOCUMENTS

2016/0020891 A1 1/2016 Jung et al.
2017/0215160 A1* 7/2017 Lohr ................... H04W 56/002
(Continued)

FOREIGN PATENT DOCUMENTS

WO 2015/171032 A1 11/2015

OTHER PUBLICATIONS

Motorola; "E-UTRA Numerology and frame structure"; 3GPP TSG RAN1 LTE Ad Hoc Cannes, France, Jun. 27-30, 2006 ; R1-061714 (Year: 2006).*
(Continued)

*Primary Examiner* — Gary Mui

(57) ABSTRACT

A method in a network node for adapting a numerology and slot structure depending on a position of a wireless device is provided. The position of the wireless device is measured by a timing advance (TA). For example, the method comprises: measuring a timing advance value for a User Equipment (UE); selecting a numerology and slot structure for UE data transmission based on the measured timing advance value; and sending an indication of the selected numerology and slot structure to the UE. A network node for carrying out this method is also provided.

19 Claims, 11 Drawing Sheets

(51) Int. Cl.
  *H04L 5/00* (2006.01)
  *H04W 28/02* (2009.01)
  *H04W 72/04* (2009.01)
(52) U.S. Cl.
  CPC ....... *H04L 5/0053* (2013.01); *H04W 28/0268* (2013.01); *H04W 72/0446* (2013.01)

(56) References Cited

U.S. PATENT DOCUMENTS

| | | | |
|---|---|---|---|
| 2018/0035421 A1* | 2/2018 | Lin | H04W 74/0833 |
| 2018/0062796 A1* | 3/2018 | Feng | H04L 5/0055 |
| 2018/0091373 A1* | 3/2018 | Manolakos | H04W 72/005 |
| 2019/0081832 A1* | 3/2019 | Marinier | H04L 5/0053 |
| 2019/0116007 A1* | 4/2019 | Yi | H04L 27/2607 |
| 2019/0132838 A1* | 5/2019 | Yi | H04W 72/0446 |
| 2019/0173656 A1* | 6/2019 | Takeda | H04W 28/06 |
| 2019/0174513 A1* | 6/2019 | Loehr | H04W 72/1268 |
| 2019/0223178 A1* | 7/2019 | Bergstrom | H04W 56/0045 |
| 2019/0261364 A1* | 8/2019 | Takeda | H04W 72/0446 |
| 2020/0163076 A1* | 5/2020 | Liu | H04W 72/048 |

OTHER PUBLICATIONS

Panasonic; "Use of multiple numerologies in NR"; 3GPP TSG RAN WG1 Meeting #86 Gothenburg, Sweden Aug. 22-26, 2016; R1-167439 (Year: 2016).*

Ericsson, NB-IoT—15 kHz subcarrier spacing for NB-IoT uplink shared channel, R1-157420, 3GPP TSG-RAN WG1 #83, Nov. 16-20, 2015 Anaheim, California, USA, 6 pages.

ZTE, ZTE Microelectronics, Consideration on the support of URLLC in NR, R2-168473, 3GPP TSG-RAN WG2 Meeting #96, Reno, USA, Nov. 14-18, 2016, 6 pages.

ISR and Written Opinion from corresponding PCT application PCT/IB2017/058226.

* cited by examiner

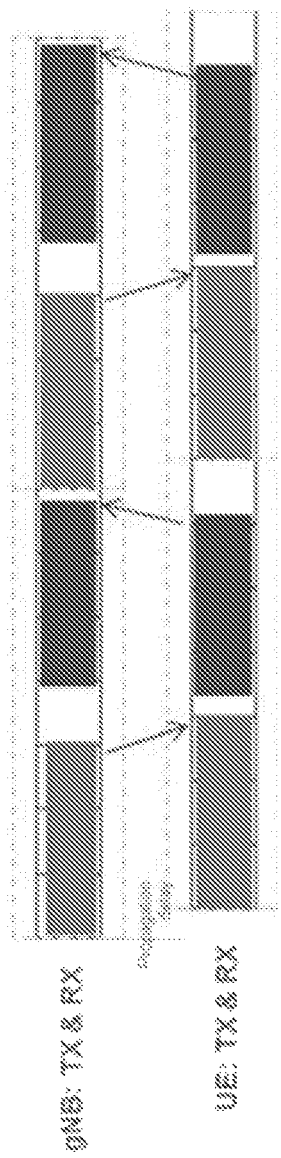
Fig. 5(a) 15KHz numerology and ½ symbol propagation delay
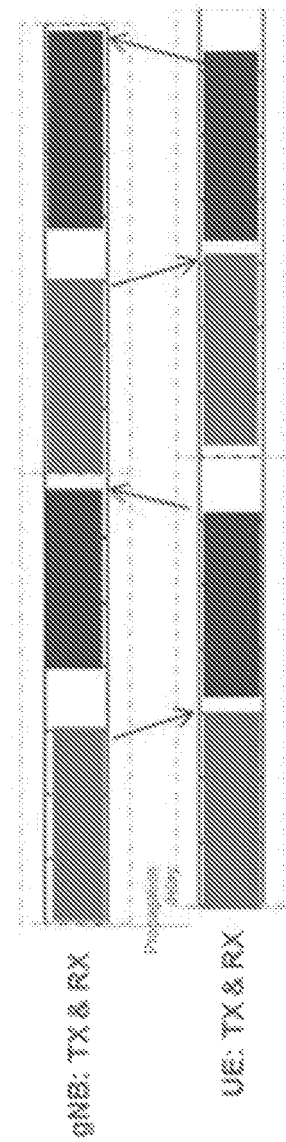
Fig. 5(b) 15KHz numerology and ¼ symbol propagation delay

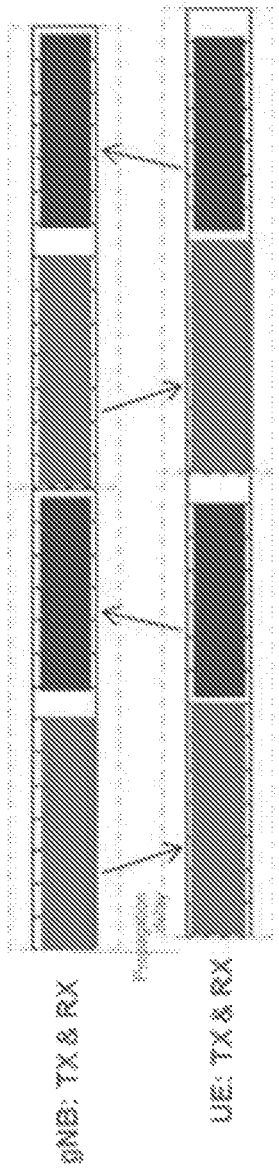
Fig. 5(c) 30KHz numerology 14-symbol slot with ½ symbol propagation delay
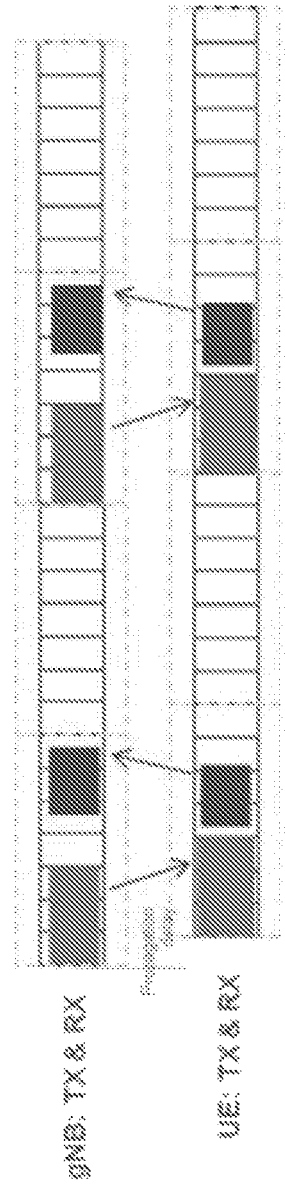
Fig. 5(d) 30KHz numerology 7-symbol slot with 1 symbol propagation delay

METHODS, DEVICE AND NODE FOR ADAPTING A NUMEROLOGY DEPENDING ON A POSITION OF A WIRELESS DEVICE

RELATED APPLICATIONS

The present application claims the benefits of priority of U.S. Provisional Patent Application No. 62/443,518, entitled "Timing advance-based throughput and latency optimization for new radio", and filed at the United States Patent and Trademark Office on Jan. 6, 2017, the content of which is incorporated herein by reference.

TECHNICAL FIELD

The present description generally relates to methods and network nodes for adapting a numerology and slot structure depending on a position of a wireless device.

BACKGROUND

Enhancements of the current mobile communication systems to provide means of communication between a wide range of machines are under discussions. A subgroup of such a communication is critical machine type communication (CMTC) where the communication requirements of very low latency, very high reliability and very high availability must be fulfilled. Example use cases are:
- Factory automation, where actuators, sensors and control systems communicate with each other. A typical requirement is: 1 ms latency.
- Motion control within construction robots, where requirements are: 1 ms latency.
- Remote control of machines, with requirements of 5-100 ms latency.
- Smart energy grids, with requirements of 3-5 ms latency.
- Etc.

Candidate communication systems to fulfill such requirements and use-cases are e.g. LTE and a newly developed radio access called New Radio (NR). New Radio (NR) (also known as 5 Generation (5G) or Next Generation) architecture is being discussed in Third Generation Partnership (3GPP) standards organization. The current NR concept is illustrated in FIG. 1, where eNB denotes Long Term Evolution (LTE) eNodeB, gNB denotes NR base station (BS) (one NR BS may correspond to one or more transmission/reception points), and the lines between the nodes illustrate the corresponding interfaces which are under discussion in 3GPP.

In NR, a scheduling unit is defined as either slot or mini-slot. An NR slot will consist of several Orthogonal Frequency Division Multiplexing (OFDM) symbols. One possible outcome is that a slot consists of seven OFDM symbols, but other structures (e.g. with 14 OFDM symbols) can be envisioned as well. It is also being discussed that NR slot and/or mini-slot may or may not contain both transmission in UpLink (UL) and DownLink (DL). Therefore, 3 configurations of slots are being discussed, namely: (1) DL-only slot; (2) UL-only slot and (3) Mixed DL and UL slot. For example, FIG. 2 shows an example of a DL subframe with a DL-only slot with seven OFDM symbols, where $T_{sf}$ and $T_f$ denote the subframe and OFDM symbol duration, respectively.

Furthermore, in NR different OFDM numerologies will be used. For example, the term "numerology" can include the following elements:

Frame duration;
Subframe or Transmission Time Interval (TTI) duration;
Slot duration;
Subcarrier spacing;
Number of subcarriers per Resource Block (RB);
Number of RBs within the bandwidth.

Table 1 lists different OFDM numerologies with different OFDM symbol duration, cyclic prefix duration, and symbol length including the cyclic prefix. Additional numerologies to those shown in Table 1 can be envisioned as well.

TABLE 1

| Different OFDM numerologies | | | |
|---|---|---|---|
| Subcarrier spacing in kHz | OFDM symbol duration in µs | Cyclic prefix length in µs | Total symbol duration in µs |
| 15 | 66.67 | 4.76 | 71.43 |
| 30 | 33.33 | 2.38 | 35.71 |
| 60 | 16.67 | 1.19 | 17.86 |
| 120 | 8.33 | 0.60 | 8.93 |

To fulfill the requirements of latency for critical applications (e.g. CMTC), a mini-slot is defined in NR. The starting position and length of the mini-slot is variable. The minimum possible length of a mini-slot is one OFDM symbol. However, the alignment of mini-slot and slot is important for better interworking and co-existence.

As an example, the operation in NR-Time Division Duplexing (TDD) is considered, as it is most likely to be the mode of operation that will be used for future systems in high frequency bands. This mode of operation can also provide a solution for latency and throughput optimization for different coverage ranges (i.e. timing advance levels/values) requiring different gap periods for NR-TDD.

Different assumptions (e.g. timing assumptions and relationships) can be considered for the NR-TDD operation, such as:
- UL-DL switching time: ~3 µs;
- Propagation time: ~0.33 µs/100 m+channel time dispersion (~CP)+fronthaul latency;
- Timing advance=2*propagation delay+gNB UL-DL switching time;
- Maximum transmission time per slot (UL+DL)=slot duration−timing advance−User Equipment (UE) DL-UL switching time.

SUMMARY

At least the following problems may be envisioned.

In an actual deployment, different UEs/devices have different positions which determine the required timing advance value. Maximum transmission time per slot is determined by the total time (or OFDM symbols) used for UL and DL transmission, and is dependent on the timing advance (or propagation delay) and guard period for Transmit-Receive (TX-RX) switching for TDD. Using the same numerology is not very efficient in terms of maximizing the transmission time per slot. This is due to the reason that transmission can only start at the next symbol (i.e. one symbol is the smallest possible guard period for TDD switch) and if the symbol size is long enough for UEs with very short timing advance, it can lead to lower utilization for actual data transmission (either UL or DL).

Certain aspects and their embodiments of the present disclosure may provide solutions to these or other problems.

Embodiments of this disclosure allow use of different numerologies depending on the UE position. For example, a UE close to the Base Station (BS) may use higher subcarrier spacing (i.e. short OFDM symbols) as compared to a UE that is at the cell edge. By doing so, the maximum transmission time within a slot can be increased. It should be noted that the positions of the UE are associated with the timing advance. Indeed, timing advance is a mechanism to synchronize the uplink and downlink subframes at the Base Station (BS)/eNB. It is determined by the propagation delay (e.g. it can be given by TA=2*propagation delay). Since different UEs have different positions, their TA values will be different so that the reception of UL transmissions at the eNB are aligned.

Also, using higher subcarrier spacing may decrease the end-to-end one-way latency of the transmission, if maximizing the transmission time is not desirable (since the minimum allowable guard period will be smaller).

In a first aspect, there is provided a method in a network node (e.g., base station, gNB, eNB) for adapting a numerology and slot structure for UE data transmissions. The method comprises: measuring a timing advance for a User Equipment (UE); selecting a numerology and slot structure for UE data transmission based on the measured timing advance; and sending an indication of the selected numerology and slot structure to the UE.

According to a second aspect, there is provided a network node for adapting a numerology and slot structure for UE data transmissions. The network node comprises processing circuitry, operable to: measure a timing advance for a User Equipment (UE); select a numerology and slot structure for UE data transmission based on the measured timing advance; and send an indication of the selected numerology and slot structure to the UE.

In some embodiments, the processing circuitry may include one or more processors and memory.

According to a third aspect, there is provided a method in the wireless device for transmitting data to a network node. The method comprises: receiving an indication of a numerology and slot structure for UE data transmission based on a timing advance of the UE; and transmitting data in accordance with the indicated numerology and slot structure in a communication network.

According to a fourth aspect, there is provided a wireless device for transmitting data to a network node. The wireless device comprises processing circuitry, and it is operable to: receive an indication of a numerology and slot structure for UE data transmission based on a timing advance of the UE; and transmit data in accordance with the indicated numerology and slot structure in a communication network.

Further aspects may comprise computer programs, computer readable media configured to process and/or store instructions for steps according to embodiments of methods disclosed herein.

Certain embodiments of aspects of the present disclosure may provide one or more technical advantages, including:
  The maximum transmission time within a slot can be increased.
  Also, using higher subcarrier spacing may decrease the end-to-end one-way latency of the transmission.
  As such, the unused time is decreased within the slot (or subframe) containing both DL and UL transmissions, and also the one-way latency can be optimized.

Certain embodiments may have some, or none of the above advantages. Other advantages will be apparent to persons of ordinary skill in the art.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIGS. 5A to 5D illustrate different propagation delays and numerologies, according to an embodiment.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 3:
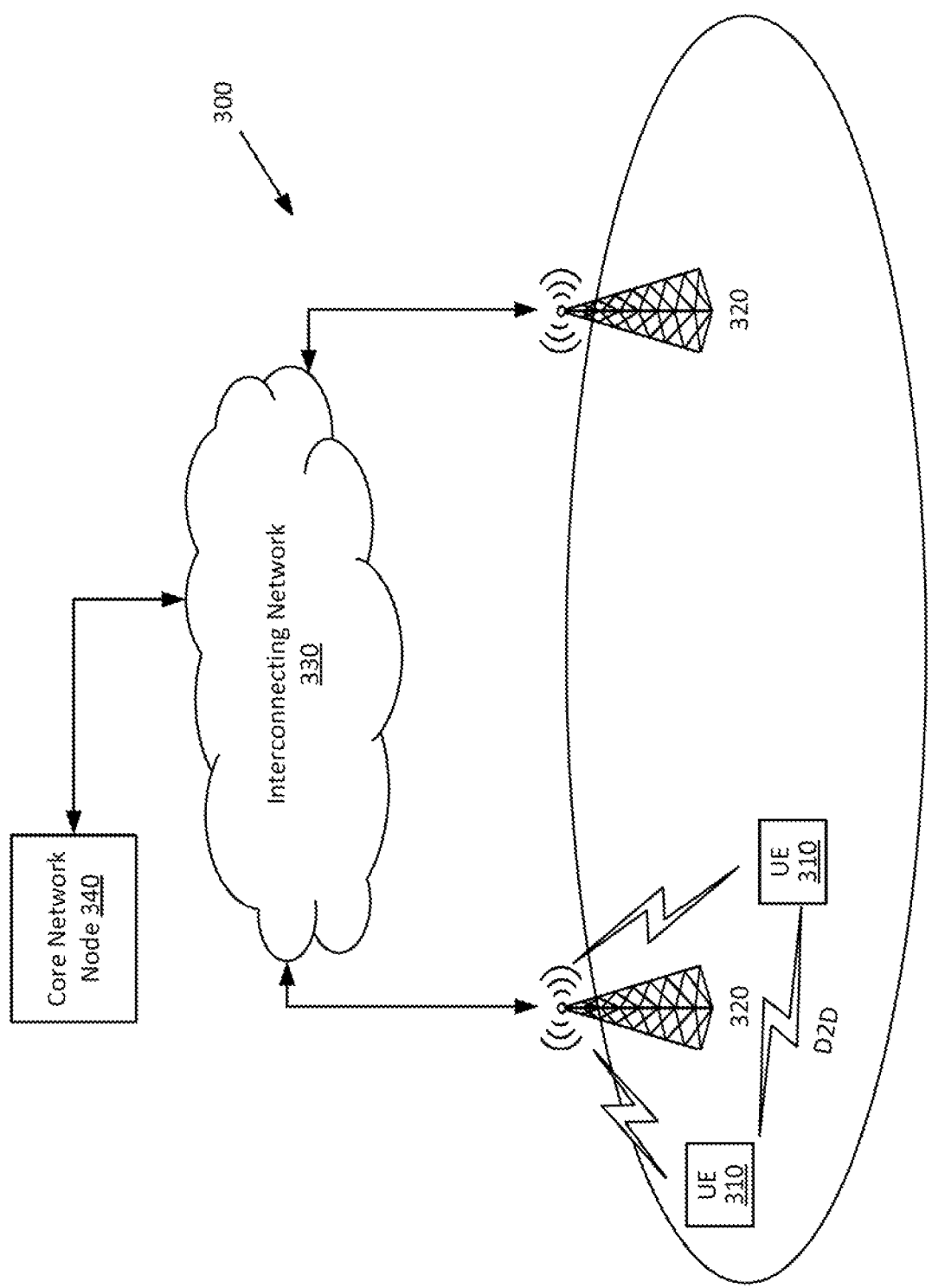
FIG. 3 illustrates a schematic diagram of a communication network.

FIG. 3 illustrates an example of a wireless communication network 300 that may be used for wireless communications. Wireless communication network 300 includes wireless devices 310 (e.g., user equipments, UEs) and a plurality of network nodes 320 (e.g., eNBs, gNBs, base stations, etc.) connected to one or more core network nodes 340 via an interconnecting network 330. Wireless devices 310 within a coverage area may each be capable of communicating directly with network nodes 320 over a wireless interface. In certain embodiments, wireless devices 310 may also be capable of communicating with each other via device-to-device (D2D) communication. In certain embodiments, network nodes 320 may also be capable of communicating with each other, e.g. via an interface (e.g. X2 in LTE or other suitable interface).

As an example, wireless device 310 may communicate with network node 320 over a wireless interface. That is, wireless device 310 may transmit wireless signals and/or receive wireless signals from network node 320. The wireless signals may contain voice traffic, data traffic, control signals, and/or any other suitable information. In some embodiments, an area of wireless signal coverage associated with a network node 320 may be referred to as a cell.

In some embodiments wireless device 310 may be interchangeably referred to by the non-limiting term user equipment (UE). Wireless device 310 can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. Example embodiments of a wireless device 310 are described in more detail below with respect to FIGS. 7 and 10.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 320 may interface with a radio network controller (not shown). The radio network controller may control network nodes 320 and may provide certain radio resource management functions, mobility management functions, and/or other suitable functions. In certain embodiments, the functions of the radio network controller may be included in the network node 320. The radio network controller may interface with the core network node 340. In certain embodiments, the radio network controller may interface with the core network node 340 via the interconnecting network 330.

The interconnecting network 330 may refer to any interconnecting system capable of transmitting audio, video, signals, data, messages, or any combination of the preceding. The interconnecting network 330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 340 may manage the establishment of communication sessions and various other functionalities for wireless devices 310. Examples of core network node 340 may include MSC, MME, SGW, PGW, O&M, OSS, SON, positioning node (e.g. E-SMLC), MDT node, etc. Wireless devices 310 may exchange certain signals with the core network node 340 using the non-access stratum layer. In non-access stratum signaling, signals between wireless devices 310 and the core network node 340 may be transparently passed through the radio access network. In certain embodiments, network nodes 320 may interface with one or more other network nodes over an internode interface. For example, network nodes 320 may interface each other over an X2 interface.

Although FIG. 3 illustrates a particular arrangement of network 300, the present disclosure contemplates that the various embodiments described herein may be applied to a variety of networks having any suitable configuration. For example, the communication network 300 may include any suitable number of wireless devices 310 and network nodes 320, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc.

It should be understood that an actual implementation of network 300 may include multiple UEs 310 and network nodes 320, and may include elements not illustrated herein. Moreover, it should be understood that different communication standards adopt somewhat different architectures and/or use different nomenclature. Unless otherwise noted, then, the depiction of a particular network architecture, or the use of standards-related nomenclature should not be construed as limiting communications control as taught herein.

Figure 4:
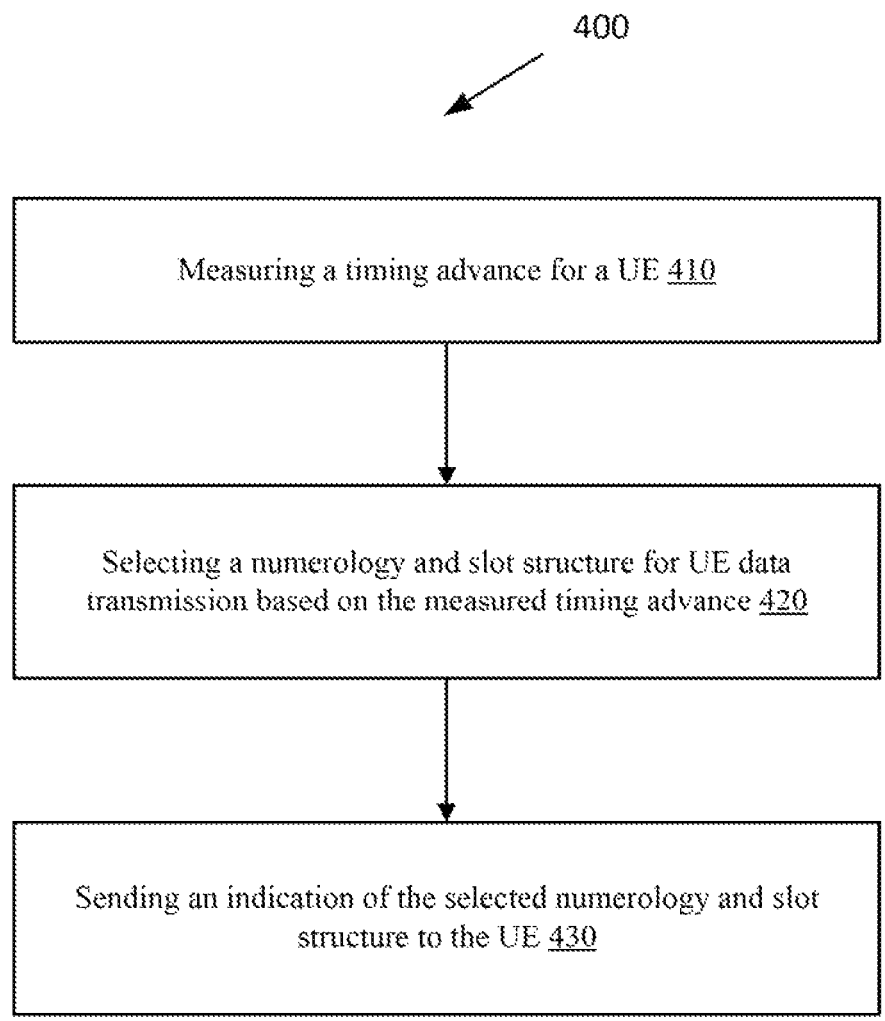
FIG. 4 illustrates a flow chart of a method in a network node, according to an embodiment.

FIG. 4 illustrates some embodiments of a method in a network node 320, such as a gNB, in accordance with an embodiment of the present disclosure.

Some embodiments of the method 400 may comprise the following steps:

Step 410: Measuring a timing advance for a UE.

Step 420: Selecting a numerology and slot structure for UE data transmission based on the measured timing advance.

Step 430: Sending an indication of the selected numerology and slot structure to the UE.

Step 410

For example, in step 410, the network node or base station or gNB may measure or continuously measure the Timing Advance (TA) from UL transmissions.

Furthermore, by measuring the TA, the gNB can determine that the measured TA value exceeds a threshold, or is expected to soon exceed the threshold associated with the current slot structure and numerology.

Step 420

For example, in step 420, once the gNB has measured the TA, it can use that value to select a numerology and slot structure for the UE to transmit data.

For example, in the case that it has determined that the TA value exceeds the threshold associated with the current slot structure and numerology, the gNB will select a new slot structure and numerology based on the new TA value. For example, the gNB can have a pre-defined table with TA value thresholds and associated configurations of slot structures and numerologies. The configurations of slot structures and numerologies may be further associated with QoS requirements, such as throughput and latencies. The gNB can use this table to choose/select the slot structure and numerology corresponding to the determined (new) TA value.

It should be noted that slot structure or slot configuration can be used interchangeably. For example, a slot structure can comprise a first number of symbols for DL, a second number of symbols for Guard Period (GP), and a third number of symbols for UL.

More specifically, the eNB or gNB selects the numerology and slot structure for a UE based on the TA value of the UE in order to optimize the latency and/or throughput (by minimizing the overhead), as will be described below.

First, it is known that the minimum time duration (i.e. TDD guard period) from DL-end until UL-start within the slot is lower-bound by the propagation delay and switching time in the UE.

Moreover, it is assumed that the processing time in the UE is related to the numerology, where it is assumed that the processing time is equal to 1 OFDM symbol independent of the duration of the OFDM symbol. For example, the processing time can be the time that the UE needs or takes to decode the data and send the corresponding feedback.

For example, FIG. 5(a) illustrates a downlink transmission and an uplink transmission, with a 15 KHz numerology and a propagation delay of ½ symbol.

Also, it is assumed that one symbol is considered to be the smallest (or minimum) unit or guard period for TDD switch.

Once a first transmission is done (for example a downlink transmission), in order to start the next transmission, the UE has to align the uplink transmission with the next symbol. As such, the UE waits for the next symbol to start before starting the uplink transmission. Therefore, some time is wasted. That is because the UE or gNB needs to wait until the next symbol starts for starting a transmission even though the propagation delay is only ½ symbol.

In FIG. 5(b), uplink and downlink transmissions are illustrated, with a 15 KHz numerology and a propagation delay of ¼ symbol. In this case, the time wasted is even worse than in the case of FIG. 5(a), because the propagation delay is only ¼ symbol, but the UE or gNB still needs to wait for the next symbol to start before starting a transmission.

In contrast, FIGS. 5(c) and (d) illustrate transmissions that are optimized, by using higher numerology, for example using a 30 KHz numerology. With higher numerologies, the symbol size is reduced. With a smaller symbol size, the next transmission is aligned faster with the next symbol and thus can be started faster. As such, less time is wasted waiting for the next symbol to start.

Therefore, some embodiments provide selecting a numerology based on the propagation delay or timing advance. If the timing advance is small, then a higher numerology can be selected in order to reduce waste of time.

Furthermore, the embodiments allow to optimize throughput or latency in the communication system 300. For example, the optimization criteria may be selected based on the traffic type, e.g. latency for Ultra Reliable Low Latency Communication (URLLC) traffic and throughput for enhanced MoBile Broadband (eMBB) traffic.

Characteristics of Different Numerologies

In order to understand better the characteristics of different numerologies, a simplified latency and overhead analysis is performed. For the latency analysis, the following is assumed:

A transmission alignment time of 1 symbol;
A DL transmission time of nDL symbols;
A UL transmission time of nUL symbols;
A processing time of 1 symbol.

The one-way UL and DL latencies as well as the guard period (GP) overhead is shown in the table below (Table 2) for six different cases of slot structure and numerology.

TABLE 2 different numerologies and slot structures based on timing advance

| Case | Numerology and slot length | Symbol length (us) | Max TA (us) | Slot structure DL-GP-UL symbols | One-way DL latency (ms) | One-way UL latency (ms) | Guard overhead (%) |
|---|---|---|---|---|---|---|---|
| 1 | 15 kHz, 0.5 ms | 72 | 72 | 3-1-3 | 0.79 | 1.07 | 14 |
| 2 | | | 36 | 3-1-3 | 0.79 | 1.07 | 14 |
| 3 | 30 kHz, 0.5 ms | 36 | 72 | 6-2-6 | 0.75 | 1.04 | 14 |
| 4 | | | 36 | 7-1-6 | 0.79 | 1.04 | 7 |
| 5 | 30 kHz, 0.25 ms | | 72 | 3-2-2 | 0.39 | 0.54 | 29 |
| 6 | | | 36 | 3-1-3 | 0.39 | 0.54 | 14 |

FIG. 5 shows the overall overhead reduction and throughput improvement by using higher subcarrier spacing for UEs closer to the BS or gNB 320, i.e. small required timing advance. DL transmission is represented in light grey and UL transmission in dark grey.

Figure 1:
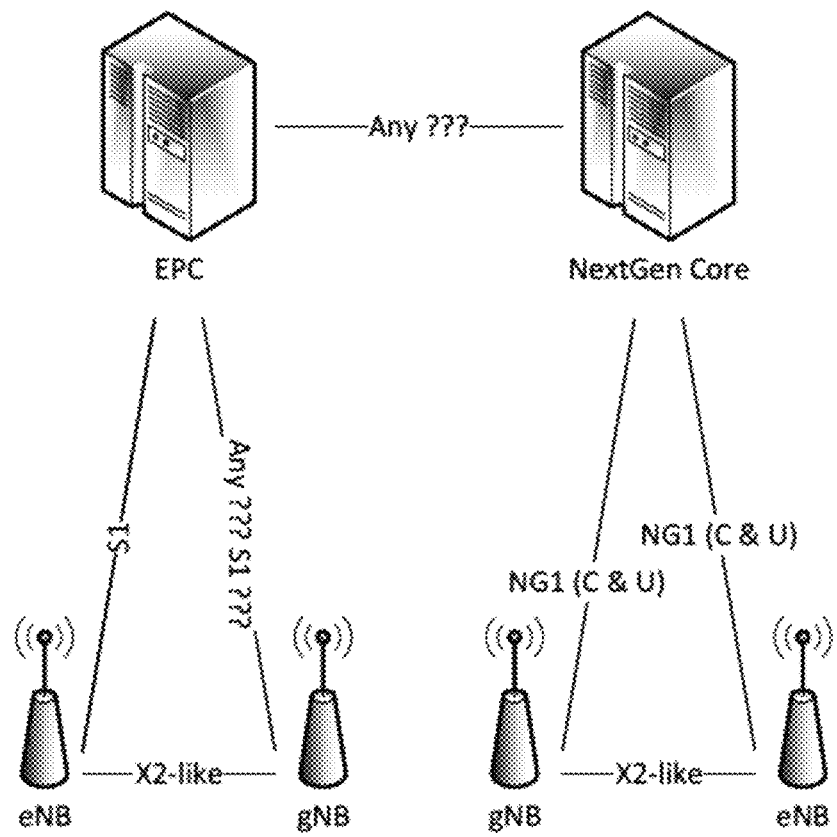
FIG. 1 is a schematic illustration of a Next Radio (NR) architecture.
Figure 2:
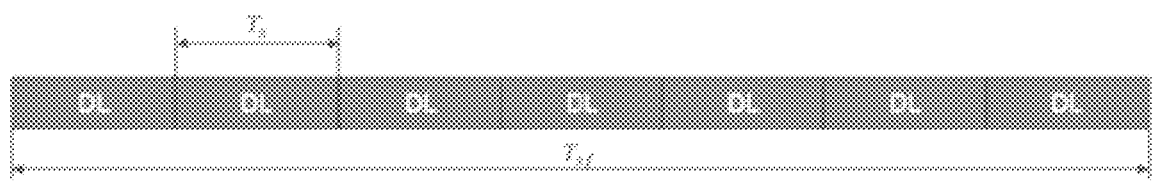
FIG. 2 is an illustration of a downlink subframe.

It can be noted that FIG. 5(a) corresponds to case 1 of Table 2 and FIG. 5(b) corresponds to case 2 of FIG. 2. 72 µs (~one OFDM symbol for 15 kHz subcarrier spacing) is the minimum possible guard time for TDD switch. This allows for propagation delay=(guard period-switching time)/2. A UE with a lower propagation time/delay means lower timing advance. Since the next transmission starts only at the beginning of the next OFDM symbol, the granularity of transmission for such a UE is lower, which may then lead to waste of resources (as depicted in FIG. 5(b)).

Optimizing for Throughput

A UE that is closer to the BS (or gNB) 320 and thereby having lower propagation delays can make use of higher numerology to decrease the symbol size. Therefore, using one OFDM symbol as TDD switch guard time/period leads to better utilization or throughput increase (either in DL or UL). This is depicted in FIG. 5(c) which corresponds to case 4.

From Table 2 above, a given maximum TA level/value can be connected to a lowest overhead due to the guard period. For a maximum TA value of 72 us (or μs), case 1 and 3 yield the same overhead, 14%, however case 3 gives the lower latency of the two. For a maximum TA value of 36 us (or μs), case 4 yields the lowest overhead (7%).

Optimizing for Latency

A UE with a certain TA value can use the high numerology to achieve a lower transmission latency, since the subframe duration can be shorter, using e.g. the 7-symbol slot length (3 DL symbols+2GP symbols+2 UL symbols). This is depicted in FIG. 5(d) which corresponds to case 5. The total latency is impacted by both the subframe and the processing time.

From Table 2 above, a given maximum TA level/value can be associated with a lowest latency. For a maximum TA value of 72 us (or μs), case 5 yields the lowest UL and DL latency (0.54 and 0.39 respectively). For a maximum TA value of 36 us (or μs), case 6 yields the lowest latency.

Step 430

In this step, once the gNB has selected the numerology and the slot structure based on the TA value, it sends an indication of the selected slot structure and numerology to the UE. The indication could be the TA value that the gNB has measured. Using that value, the UE will able to select the corresponding slot structure and numerology, by looking up a table, such as Table 2 (with TA values and corresponding slot structure and numerologies), this table being shared with the gNB and the UE, for example.

The indication could be also the selected slot structure and numerology themselves.

To send the indication, the gNB can use Radio Resource Control (RRC) or any equivalent protocols. For example, the gNB can signal the measured TA value or the selected numerology and slot structure as a Media Access Control (MAC) control element, or over DL control.

Handover

In some embodiments, in case of a handover, when the UE changes from a first gNB to a second gNB, the second gNB may realize that the TA value of the UE with respect to the second gNB is different from the TA value with respect to the first gNB. In this case, the second gNB can change the slot configuration and numerology in order to optimize the performance. To do so, the second gNB can select a new slot configuration and numerology based on the new TA value and based on other optimization criteria, such as throughput and latency.

This can be interesting for remote radio heads, where a significant delay is added between baseband and radio transmission point, which can add to the TA value above the mere propagation delay. The network node 320 can proactively set the appropriately optimized slot configuration for the estimated TA value in the new (second) gNB, according to the teachings of this disclosure. It can also check if the TA value needs to be dynamically changed in the gNB because of modified remote radio head delay.

Monitoring Traffic

In some embodiments, the eNB or gNB 320 can further detect a type of traffic or a change of traffic in the communication network 300. For example, the eNB or gNB 320 can detect that traffic to the UE is changing from throughput critical traffic to latency critical traffic. As such, the eNB or gNB can change the configuration of the slot structures and numerologies for the UE based on its current TA value, and further based on the traffic type, in order to optimize either throughput or latency.

As mentioned above, the embodiments of this disclosure provide a method in a network node 320 for selecting a numerology and a slot structure based on the propagation delay or timing advance of a wireless device.

For example, some embodiments can measure a timing advance and determine that the measured timing advance exceeds a threshold associated with a current slot structure and numerology.

In some embodiments, the selected numerology and slot structure may be different from the current slot structure and numerology.

Some embodiments may determine a numerology and slot structure associated with the measured timing advance from a pre-configured table. The pre-configured table can be the Table 2, for example.

For example, the timing advance can be proportional to a propagation delay. Also, the slot structure can comprise a first number of symbols for a downlink transmission, a second number of symbols for a guard period and a third number of symbols for an uplink transmission. Furthermore, the timing advance value is associated with a position of the UE.

Some embodiments may select higher numerologies for smaller timing advance values so that a symbol size is decreased.

Some embodiments can select higher numerologies for UEs close to the network node as compared to UEs that are at the edge of a cell.

Some embodiments can comprise selecting the numerology and slot structure that optimize a latency requirement for data transmission. To do so, the slot structure whose subframe duration is shorter than the duration of the current subframe is selected.

Some embodiments can comprise selecting the numerology and slot structure that optimize a throughput for data transmission. To do so, the slot structure having a number of symbols for a guard period that is minimized is selected.

Some embodiments may detect a type of traffic or a change of traffic. For example, the change of traffic can comprise changing traffic from throughput critical traffic to latency critical traffic.

Furthermore, some embodiments can select the numerology and slot structure based on the detected type of traffic or change of traffic.

In some embodiments, the indication may comprise the measured timing advance.

In some embodiments, the indication may comprise the selected numerology and slot structure.

Figure 6:
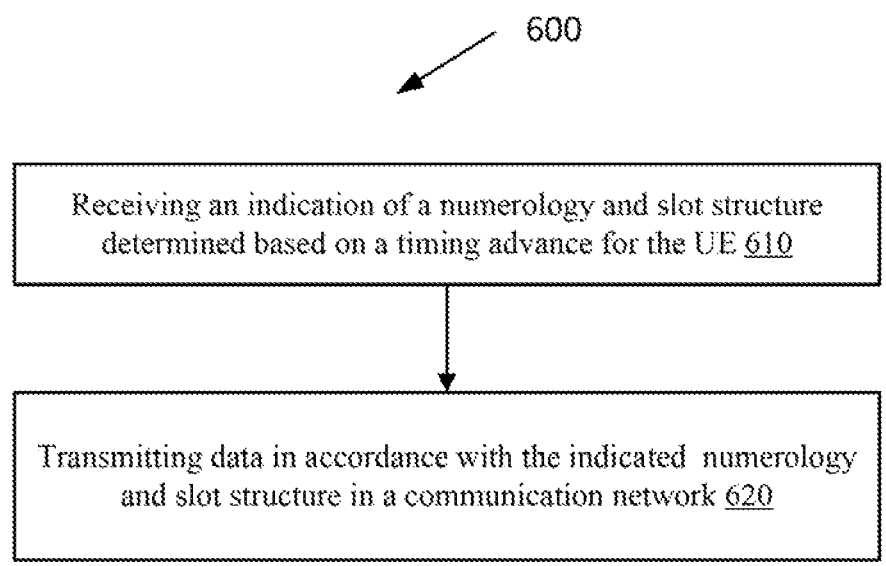
FIG. 6 illustrates a flow chart of a method in a user equipment, according to an embodiment.

FIG. 6 illustrates some embodiments of a method 600 in a UE, such as the wireless device 310, in accordance with an aspect of the present disclosure.

Some embodiments of the method 600 according to this aspect comprise the following steps:

Step 610: Receiving an indication of a numerology and slot structure determined based on a timing advance for the UE.

Step 620: Transmitting data in accordance with the indicated numerology and slot structure in a communication network.

The communication network can be the communication network 300 of FIG. 3, for example.

Step 610

In this step, the UE receives the indication of a numerology and slot structure that is selected by the gNB based on the TA value of the UE, using RRC, for example. As such, as the UE moves within a cell, the UE may receive different numerologies and slot structures based on its position (e.g. through the TA values), for transmitting data to the network node 320.

The indication could be the TA value determined by the gNB for the UE. In this case, the UE has access to a table with predefined values of TA with corresponding slot structures and numerologies, for example. The table could be the Table 2 as described above. When the UE receives the determined TA value, it uses that value to look up the table to find the corresponding slot structure and numerology. The use of a table is only an example, a person skilled in the art can contemplate other ways of associating the TA values with the slot structures and numerologies.

The indication can alternatively comprise the slot structure and the numerology determined by the gNB. The determined slot structure and numerology can be signaled to the UE using RRC, for example.

Some embodiments may determine the numerology and slot structure corresponding to the received timing advance, using a pre-configured table for example, such as Table 2.

Some embodiments may select higher numerologies for smaller timing advance values so that a symbol size is decreased.

In some embodiments, the timing advance is proportional to a propagation delay and is also associated with a position of the UE.

In some embodiments, the slot structure may comprise a first number of symbols for a downlink transmission, a second number of symbols for a guard period and a third number of symbols for an uplink transmission.

Some embodiments may select higher numerologies when a position of the UE is close to the network node as compared to UEs which are at an edge of a cell.

Some embodiments may select the numerology and slot structure that optimize a latency. To do so, the UE may select a numerology and slot structure which has a subframe with a duration shorter than the duration of a current subframe, the selected numerology and slot structure being associated with the received timing advance value.

Some embodiments may select the numerology and slot structure that optimize a throughput for data transmission. To do so, the UE may select a numerology and slot structure having a number of symbols for a guard period that is minimized, the selected numerology and slot structure being associated with the received timing advance value.

Step 620

In this step, the UE 310 uses the numerology and slot structure determined by the gNB 320 to transmit data to the communication network 300. In other words, the UE 310 transmits the data according to the indicated numerology and slot structure.

Figure 7:
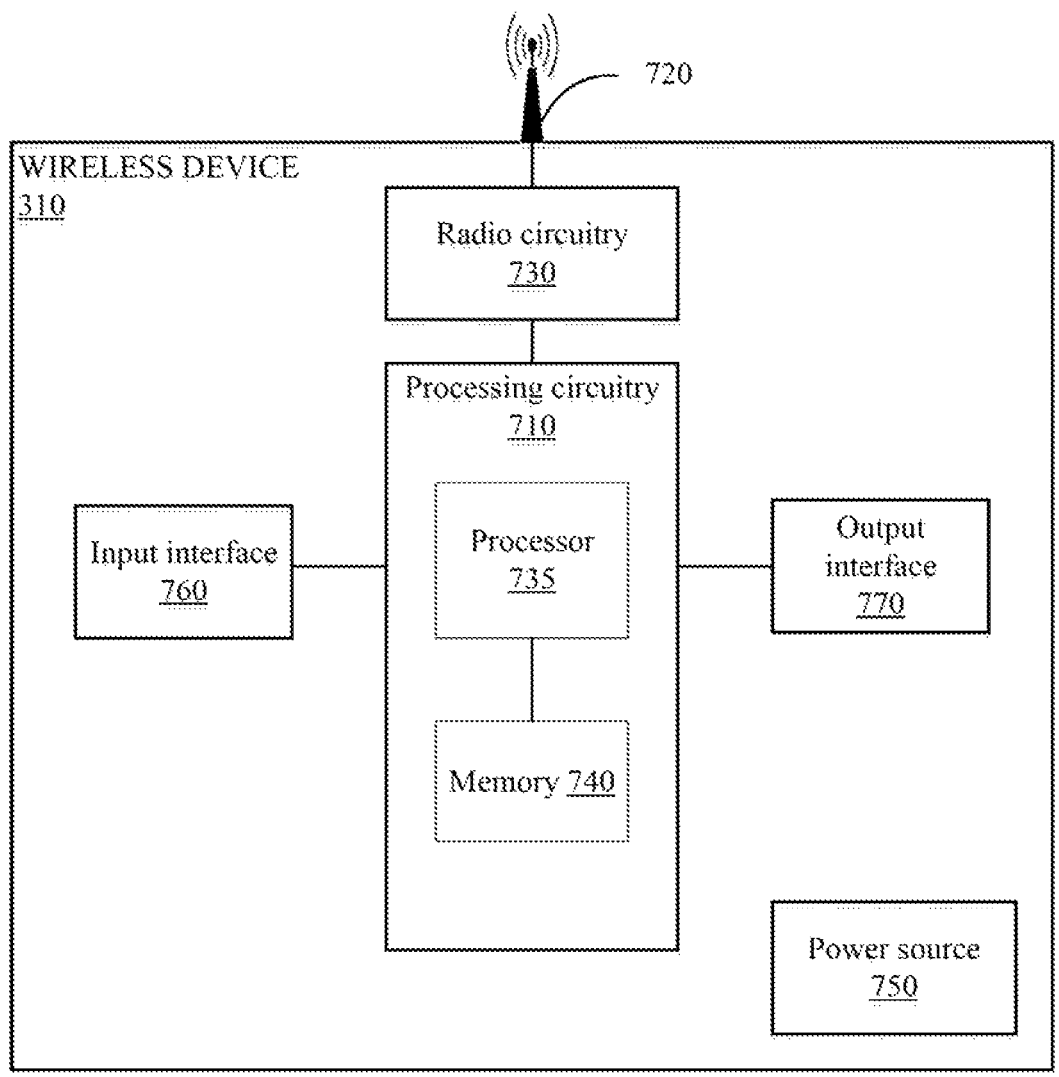
FIG. 7 illustrates a schematic diagram of a wireless device according to an embodiment.

FIG. 7 illustrates a user equipment (UE) 310, which is an example wireless device. UE 310 includes an antenna 720, radio front-end circuitry 730, processing circuitry 710, input interface 760, output interface 770 and power source 750. Antenna 720 may include one or more antennas or antenna arrays, and is configured to send and/or receive wireless signals, and is connected to radio front-end circuitry 730. In certain alternative embodiments, UE 310 may not include antenna 720, and antenna 720 may instead be separate from UE 310 and be connectable to UE 310 through an interface or port.

The radio front-end circuitry 730 may comprise various filters and amplifiers, is connected to antenna 720 and processing circuitry 710, and is configured to condition signals communicated between antenna 720 and processing circuitry 710. In certain alternative embodiments, UE 310 may not include radio front-end circuitry 730, and processing circuitry 710 may instead be connected to antenna 720 without radio front-end circuitry 730.

Processing circuitry 710 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 710 may include, for example, one or more central processing units (CPUs), one or more microprocessors, one or more application specific integrated circuits (ASICs), and/or one or more field programmable gate arrays (FPGAs).

In some embodiments, the processing circuitry 710 comprises one or more processors 735 and a memory (or storage) 740, connected thereto. Some or all of the functionality described herein, such as method 600 and related embodiments, as being provided by a wireless device may be provided by the processor 735 executing instructions stored on the computer-readable storage medium 740. In alternative embodiments, some or all of the functionality may be provided by the processing circuitry 710 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 710 alone or to other components of UE 310, but are enjoyed by the wireless device or UE as a whole, and/or by end users and the wireless network generally.

Antenna 720, radio front-end circuitry 730, and/or processing circuitry 710 may be configured to perform any receiving operations described herein as being performed by a wireless device. Any information, data and/or signals may be received from a network node and/or another wireless device.

The processing circuitry 710 may be configured to perform any determining operations described herein as being performed by a wireless device. Determining as performed by processing circuitry 710 or processor 735 may include processing information obtained by the processing circuitry 710 by, for example, converting the obtained information into other information, comparing the obtained information or converted information to information stored in the wireless device, and/or performing one or more operations based on the obtained information or converted information, and as a result of said processing making a determination.

The input interface 760 and output interface 770 may be configured to perform any transmitting operations described herein as being performed by a wireless device. Any information, data and/or signals may be transmitted to a network node and/or another wireless device. The input interface 760 and the output interface 770 can be collectively referred to as network interfaces.

Computer-readable storage medium 740 is generally operable to store instructions, such as a computer program, software, an application including one or more of logic, rules, code, tables, etc. and/or other instructions capable of being executed by a processor. Examples of computer-readable storage medium 740 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 710. In some embodiments, processing circuitry 710 and computer-readable storage medium 740 may be considered to be integrated.

Alternative embodiments of UE 310 may include additional components beyond those shown in FIG. 7 that may be responsible for providing certain aspects of the UE's functionality, including any of the functionality described herein and/or any functionality necessary to support the solution described above. As just one example, UE 310 may include input interfaces, devices and circuits, and output interfaces, devices and circuits. Input interfaces, devices, and circuits are configured to allow input of information into UE 310, and are connected to processing circuitry 710 to allow processing circuitry 710 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 310, and are connected to processing circuitry 710 to allow processing circuitry 710 to output information from UE 310. For example, output interfaces, devices, or circuits may include a speaker, a display, vibrating circuitry, a USB port, a headphone interface, or other output elements. Using one or more input and output interfaces, devices, and circuits, UE 310 may communicate with end users and/or the wireless network, and allow them to benefit from the functionality described herein.

As another example, UE 310 may include power source 750. Power source 750 may comprise power management circuitry. Power source 750 may receive power from a power supply, which may either be comprised in, or be external to, power source 750. For example, UE 310 may comprise a power supply in the form of a battery or battery pack which is connected to, or integrated in, power source 750. Other types of power sources, such as photovoltaic devices, may also be used. As a further example, UE 310 may be connectable to an external power supply (such as an electricity outlet) via an input circuitry or interface such as an electrical cable, whereby the external power supply supplies power to power source 750. Power source 750 may be connected to radio front-end circuitry 730, processing circuitry 710, and/or computer-readable storage medium 740 and be configured to supply UE 310, including processing circuitry 710, with power for performing the functionality described herein.

UE 310 may also include multiple sets of processing circuitry 710, computer-readable storage medium 740, radio circuitry 730, and/or antenna 720 for different wireless technologies integrated into wireless device 310, such as, for example, GSM, WCDMA, LTE, NR, WiFi, or Bluetooth wireless technologies. These wireless technologies may be integrated into the same or different chipsets and other components within wireless device or UE 310 Other embodiments of wireless device 310 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 310 may include input devices and circuits, output devices, and one or more synchronization units or circuits, which may be part of the one or more processors. Input devices include mechanisms for entry of data into wireless device 310. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
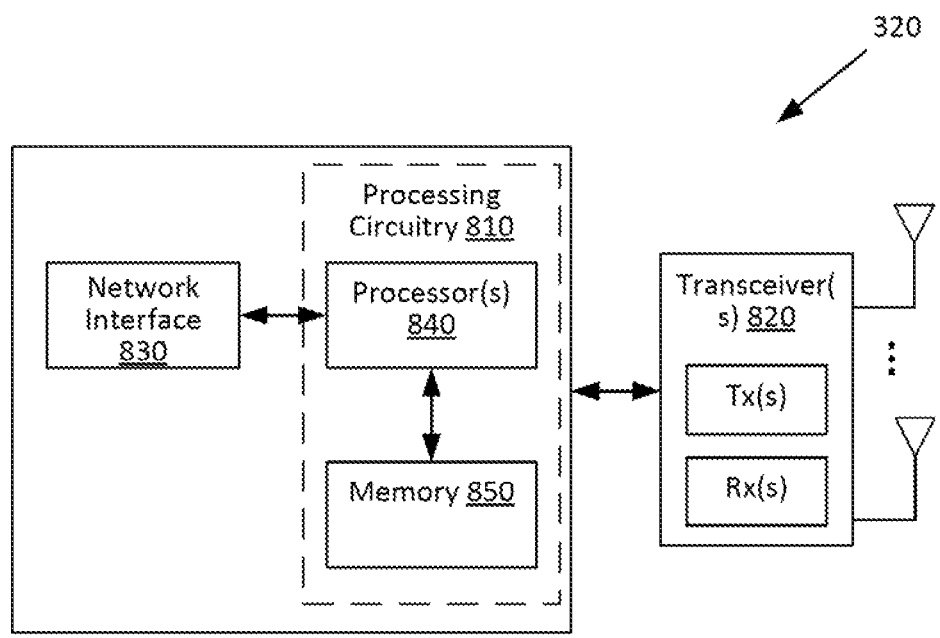
FIG. 8 illustrates a schematic diagram of a network node according to an embodiment.

FIG. 8 is a block diagram of an exemplary network node 320, which can be a base station, or gNB, for example, in accordance with certain embodiments. The network node 320 includes processing circuitry 810, network interface 830 and one or more transceivers 820. The circuitry 810 may include one or more processors 840, and memory 850. In some embodiments, the transceiver 820 facilitates transmitting wireless signals to and receiving wireless signals from wireless device 310 (e.g., via an antenna), the one or more processors 840 executes instructions to provide some or all of the functionalities described above, such as method 600 and related embodiments, as being provided by the network node 320, the memory 850 stores the instructions for execution by the one or more processors 840, and the network interface 830 communicates signals to backend network components, such as a gateway, switch, router, Internet, Public Switched Telephone Network (PSTN), core network nodes or radio network controllers, etc.

The one or more processors 840 may include any suitable combination of hardware and software implemented in one or more modules to execute instructions and manipulate data to perform some or all of the described functions of the network node 320, such as those described above. In some embodiments, the one or more processors 840 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 840 may comprise one or more of the modules discussed below with respect to FIG. 8.

The memory 850 is generally operable to store instructions, such as a computer program, software, an application including one or more of logic, rules, algorithms, code, tables, etc. and/or other instructions capable of being executed by one or more processors 840. Examples of memory 850 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 830 is communicatively coupled to the one or more processors 840 and may refer to any suitable device operable to receive input for the network node 320, send output from the network node 320, perform suitable processing of the input or output or both, communicate to other devices, or any combination of the preceding. The network interface 830 may include appropriate hardware (e.g., port, modem, network interface card, etc.) and software, including protocol conversion and data processing capabilities, to communicate through a network.

Other embodiments of the network node 320 may include additional components beyond those shown in FIG. 8 that may be responsible for providing certain aspects of a network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 7-8 may be included in other network nodes (such as core network node 340). Other network nodes may optionally include or not include a wireless interface (such as the transceiver described in FIG. 8). Functionalities described may reside within the same radio node or network node or may be distributed across a plurality of radios nodes and network nodes.

Figure 9:
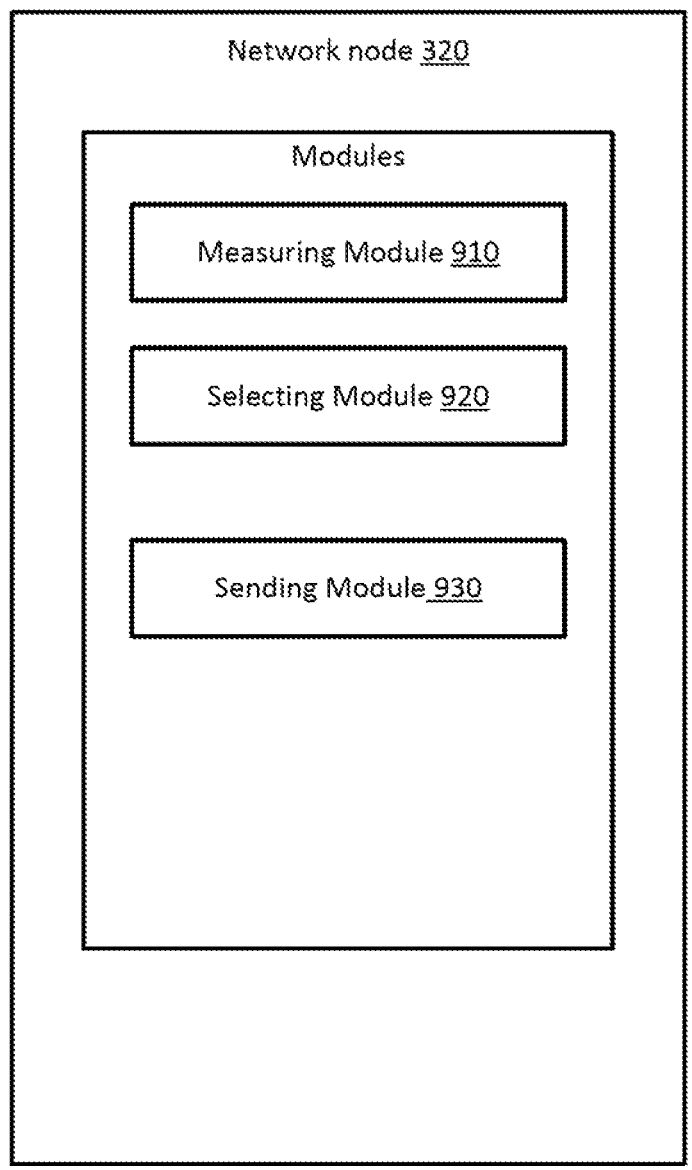
FIG. 9 illustrates a schematic diagram of a network node according to another embodiment.

FIG. 9 illustrates an example of the network node 320 in accordance with certain embodiments. The network node 320 may include a measuring module 910, a selecting module 920 and a sending module 930.

In certain embodiments, the measuring module 910 may perform a combination of steps that may include steps such as Steps 410 in FIG. 4.

In certain embodiments, the selecting module 920 may perform a combination of steps that may include steps such as Step 420 in FIG. 4.

In certain embodiments, the sending module 930 may perform a combination of steps that may include steps such as Step 430 in FIG. 4.

In certain embodiments, the measuring module 910, selecting module 920 and the sending module 930 may be implemented using one or more processors, such as described with respect to FIG. 8. The modules may be integrated or separated in any manner suitable for performing the described functionality.

Figure 10:
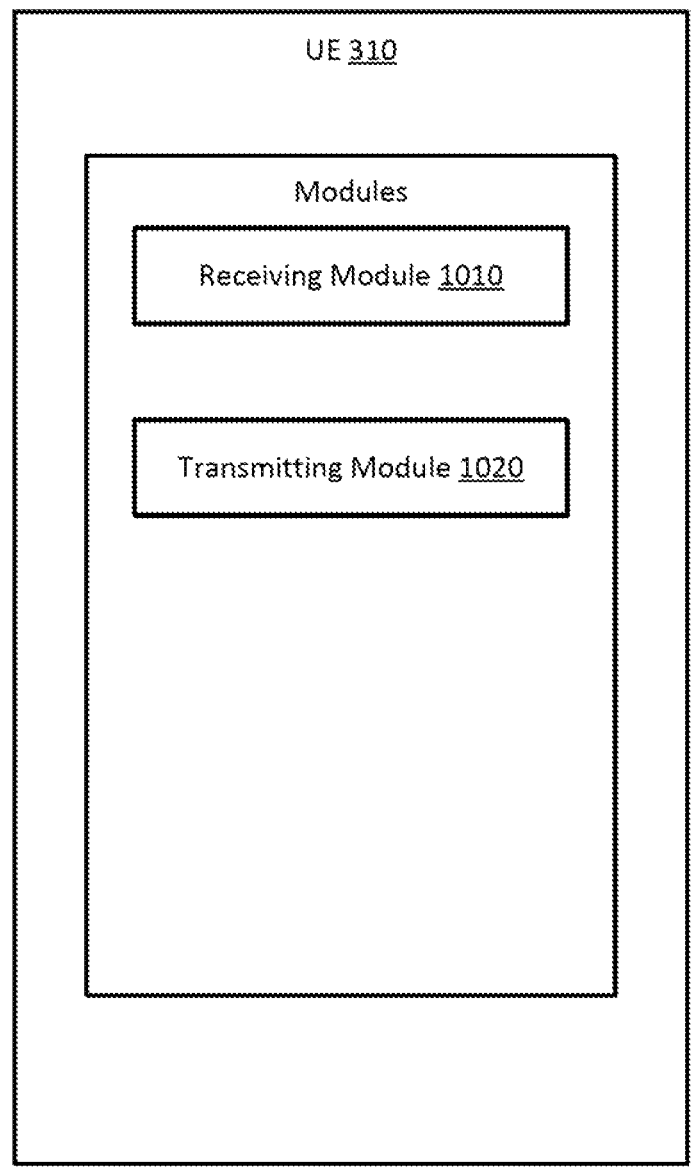
FIG. 10 illustrates a schematic diagram of a wireless device according to another embodiment.

FIG. 10 illustrates an example of the UE 310 in accordance with certain embodiments. The UE 310 may include a receiving module 1010 and a transmitting module 1020.

In certain embodiments, the receiving module 1010 may perform a combination of steps that may include steps such as Step 610 in FIG. 6.

In certain embodiments, the transmitting module 1020 may perform a combination of steps that may include steps such as Step 620 in FIG. 6.

In certain embodiments, the receiving module 1010 and the transmitting module 1020 may be implemented using one or more processors, such as described with respect to FIG. 7. The modules may be integrated or separated in any manner suitable for performing the described functionality.

It should be noted that according to some embodiments, virtualized implementations of the network node 320 of FIGS. 8 and 9 or wireless device 310 of FIGS. 7 and 10 are possible. As used herein, a "virtualized" network node (e.g., a virtualized base station or a virtualized radio access node) is an implementation of the network node in which at least a portion of the functionality of the network is implemented as a virtual component (e.g., via a virtual machine(s) executing on a physical processing node(s) in a network(s)). The functions of the wireless device 310 and network node 320 (described hereinabove) are implemented at the one or more processors 710 and 840 respectively or distributed across a cloud computing system. In some particular embodiments, some or all of the functions of the wireless device 310 and network node 320 (described herein) are implemented as virtual components executed by one or more virtual machines implemented in a virtual environment(s) hosted by processing node(s).

Figure 11:
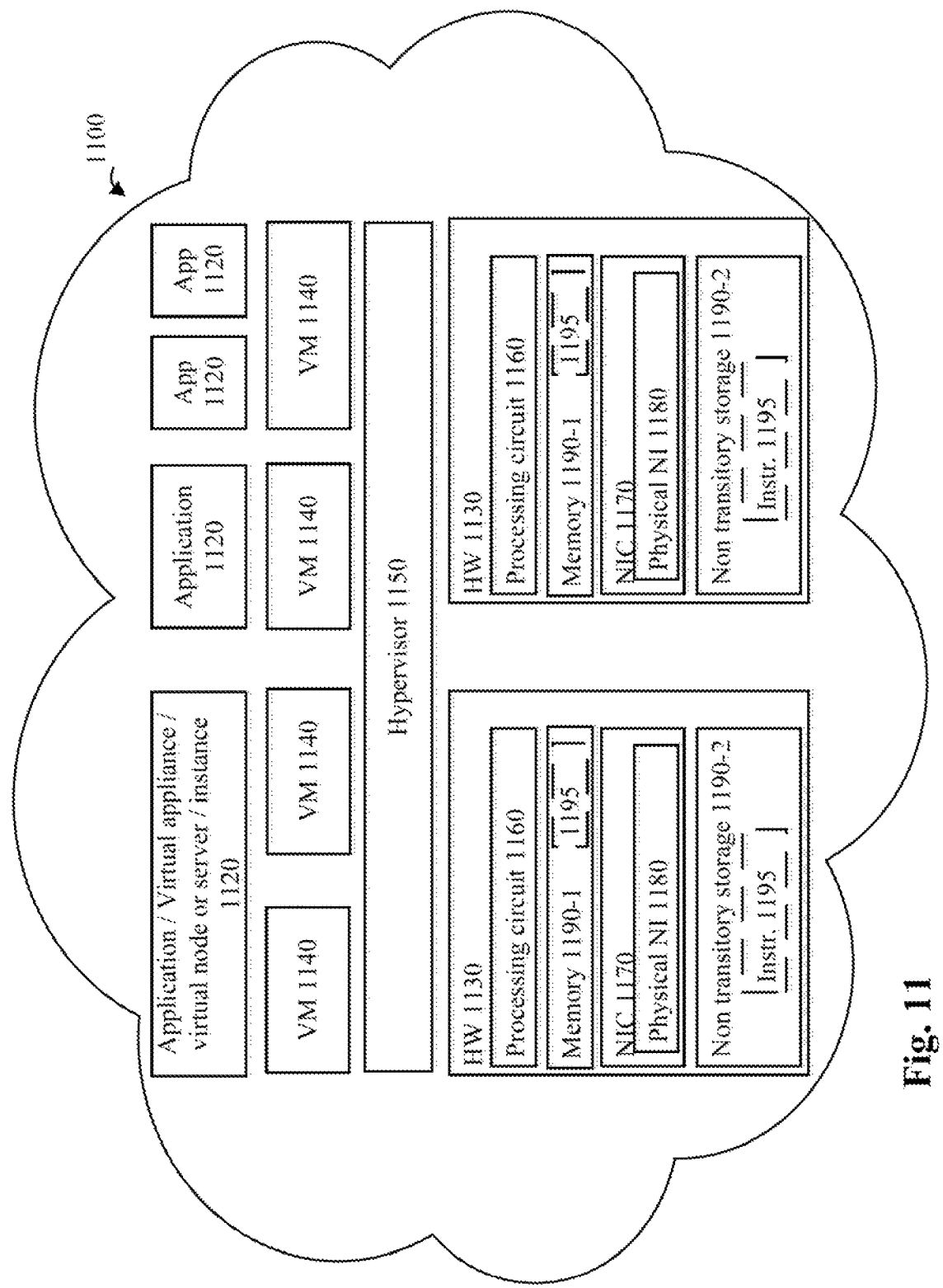
FIG. 11 illustrates a cloud computing environment for performing the methods of FIGS. 4 and 6.

For example, turning to FIG. 11, there is provided an instance or a virtual appliance 1120 implementing the methods 400 and 600 or parts of the methods 400 and 600 of some embodiments. The instance runs in a cloud computing environment 1100 which provides processing circuit 1160 and memory 1190. The memory contains instructions 1195 executable by the processing circuit 1160 whereby the instance 1120 is operative to execute the methods or part of the methods previously described in relation to some embodiments.

The comprises a general-purpose network device including hardware 1130 comprising a set of one or more processor (s) or processing circuits 1160, which may be commercial off-the-shelf (COTS) processors, dedicated Application Specific Integrated Circuits (ASICs), or any other type of processing circuit including digital or analog hardware components or special purpose processors, and network interface controller(s) 1170 (NICs), also known as network interface cards, which include physical Network Interface 1180. The general-purpose network device also includes non-transitory machine readable storage media 1190-2 having stored therein software and/or instructions 1195 executable by the processor 1160. During operation, the processor(s) 1160 execute the software/instructions 1195 to instantiate a hypervisor 1150, sometimes referred to as a virtual machine monitor (VMM), and one or more virtual machines 1140 that are run by the hypervisor 1150.

A virtual machine 1140 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1140, and that part of the hardware 1130 that executes that virtual machine, be it hardware dedicated to that virtual machine and/or time slices of hardware temporally shared by that virtual machine with others of the virtual machine(s) 1140, forms a separate virtual network element(s) (VNE).

The hypervisor 1150 may present a virtual operating platform that appears like networking hardware to virtual machine 1140, and the virtual machine 1140 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual appliance 1120 may be implemented on one or more of the virtual machine(s) 1140, and the implementations may be made differently.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any two or more embodiments described in this document may be combined in any way with each other. Furthermore, the described embodiments are not limited to the described radio access technologies (e.g., LTE, NR). That is, the described embodiments can be adapted to other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Some of the abbreviations used in this disclosure include:

| | |
|---|---|
| BCCH | Broadcast Control Channel |
| BCH | Broadcast Channel |
| CDMA | Code Division Multiplexing Access |
| CGI | Cell Global Identifier |
| CP | Cyclic Prefix |
| CSI | Channel State Information |
| DCCH | Dedicated Control Channel |
| DL | Downlink |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| GERAN | GSM EDGE Radio Access Network |
| GSM | Global System for Mobile communication |
| HARQ | Hybrid Automatic Repeat Request |
| HO | Handover |
| MAC | Medium Access Control |
| MSC | Mobile Switching Center |
| NR | New Radio |
| OFDM | Orthogonal Frequency Division Multiplexing |
| OFDMA | Orthogonal Frequency Division Multiple Access |
| PBCH | Physical Broadcast Channel |
| P-CCPCH | Primary Common Control Physical Channel |
| PCell | Primary Cell |
| PCFICH | Physical Control Format Indicator CHannel |
| PDCCH | Physical Downlink Control CHannel |
| PDSCH | Physical Downlink Shared Channel |
| PUCCH | Physical Uplink Control CHannel |
| PUSCH | Physical Uplink Shared Channel |
| RLM | Radio Link Management |
| RRC | Radio Resource Control |
| RSCP | Received Signal Code Power |
| RSRP | Reference Signal Received Power |
| RSRQ | Reference Signal Received Quality |
| RSSI | Received Signal Strength Indicator |
| RSTD | Reference Signal Time Difference |
| RACH | Random Access Channel |
| RAT | Radio Access Technology |
| RNC | Radio Network Controller |
| RNTI | Radio Network Temporary Identifier |
| RRC | Radio Resource Control |
| RRM | Radio Resource Management |
| SCH | Synchronization Channel |
| SCell | Secondary Cell |
| SNR | Signal Noise Ratio |
| UE | User Equipment |
| UL | Uplink |
| UMTS | Universal Mobile Telecommunication System |
| UTRA | Universal Terrestrial Radio Access |
| UTRAN | Universal Terrestrial Radio Access Network |
| WCDMA | Wide CDMA |
| WLAN | Wireless Local Area Network |

Example Embodiments

1. A method in a network node, the method comprising:
    measuring a timing advance value for a User Equipment (UE);
    selecting a numerology and slot structure for UE data transmission based on the measured timing advance value; and
    sending an indication of the selected numerology and slot structure to the UE.
2. The method of example 1, wherein measuring the timing advance value comprises determining that the timing advance value exceeds a threshold associated with a current numerology and slot structure.
3. The method of any of examples 1 to 2, wherein selecting the numerology and slot structure further comprises selecting the numerology and slot structure that optimize a throughput for data transmission.
4. The method of any of examples 1 to 3, wherein selecting the numerology and slot structure further comprises selecting the numerology and slot structure that optimize a latency requirement for data transmission.
5. The method of example 1, further comprising detecting a type or a change of traffic.
6. The method of example 5, further comprising selecting the numerology and slot structure based on the detected type or change of traffic.

7. A network node comprising circuitry, the network node operable to perform any one or more of the methods of examples 1-6.

8. The network node of example 7, the circuitry comprising memory and one or more processors.

9. A computer program product comprising a non-transitory computer readable storage medium having computer readable program code embodied in the medium, the computer readable program code comprising computer readable code to perform any one or more of the methods of examples 1-6.

10. A non-transitory computer readable memory configured to store executable instructions for a network node, the executable instructions when executed by one or more processors cause the network node to perform any of the method of the example embodiments described above.

11. A method in a User Equipment (UE), the method comprising:
receiving an indication of a numerology and slot structure for UE data transmission based on a timing advance value of the UE; and
transmitting data in accordance with the indicated numerology and slot structure in a communication network.

12. The method of example 11, wherein receiving the indication of the numerology and slot structure comprises receiving the numerology and the slot structure.

13. The method of example 12, wherein receiving the indication of the numerology and slot structure comprises receiving the timing advance value of the UE measured by a network node.

14. The method of example 13, further comprising determining the numerology and slot structure corresponding to the received timing advance value.

15. The method of example 14, wherein determining the numerology and slot structure corresponding to the received timing advance value further comprises determining the numerology and slot structure that optimize a throughput for data transmission.

16. The method of example 15, wherein determining the numerology and slot structure corresponding to the received timing advance value further comprises determining the numerology and slot structure that optimize a latency for data transmission.

17. A User Equipment (UE) comprising circuitry, the UE operable to perform any one or more of the methods of examples 11-16.

18. The UE of example 17, the circuitry comprising memory and one or more processors.

19. A computer program product comprising a non-transitory computer readable storage medium having computer readable program code embodied in the medium, the computer readable program code comprising computer readable code to perform any one or more of the methods of examples 11-16.

20. A non-transitory computer readable memory configured to store executable instructions for a User Equipment (UE), the executable instructions when executed by one or more processors cause the UE to perform any of the method of the example embodiments described above

What is claimed is:

1. A network node comprising processing circuitry, the processing circuitry comprising memory and one or more processors, the memory including instructions, that, when executed, cause the network node to:
measure a timing advance for a User Equipment (UE);
select a numerology and slot structure for UE data transmission based on the measured timing advance, wherein selecting the numerology and slot structure based on the measured timing advance comprises selecting higher numerologies when a position of the UE is close to a network node as compared to UEs which are at an edge of a cell; and
send an indication of the selected numerology and slot structure to the UE.

2. A method in a User Equipment (UE), the method comprising:
receiving an indication of a numerology and slot structure for UE data transmission based on a timing advance of the UE; and
transmitting data in accordance with the indicated numerology and slot structure in a communication network, wherein the indication of the numerology and slot structure comprises selecting higher numerologies when a position of the UE is close to a network node as compared to UEs which are at an edge of a cell.

3. The method of claim 2, wherein receiving the indication of the numerology and slot structure comprises receiving a value of the timing advance of the UE, measured by a network node.

4. The method of claim 3, further comprising determining the numerology and slot structure corresponding to the received timing advance value, from a pre-configured table.

5. The method of claim 4, wherein determining the numerology and slot structure corresponding to the received timing advance value comprises selecting higher numerologies for smaller timing advance values so that a symbol size is decreased.

6. The method of claim 4, wherein determining the numerology and slot structure further comprises selecting the numerology and slot structure that optimize one of a latency requirement for data transmission and a throughput for data transmission.

7. The method of claim 6, wherein selecting the numerology and slot structure that optimize the latency requirement further comprises selecting a numerology and slot structure which has a subframe with a duration that is shorter than a duration of a current subframe, the selected numerology and slot structure being associated with the received timing advance.

8. The method of claim 6, wherein selecting the numerology and slot structure that optimize the throughput comprises selecting a numerology and slot structure which has a number of symbols for a guard period that is minimized, the selected numerology and slot structure being associated with the received timing advance.

9. The method of claim 2, wherein the slot structure comprises a first number of symbols for a downlink transmission, a second number of symbols for a guard period and a third number of symbols for an uplink transmission.

10. A User Equipment (UE) comprising processing circuitry, the processing circuitry comprising a processor and a memory connected thereto, the memory including instructions, that, when executed, cause the UE to:
receive an indication of a numerology and slot structure for UE data transmission based on a timing advance of the UE; and
transmit data in accordance with the indicated numerology and slot structure in a communication network, wherein the indication of the numerology and slot structure comprises selecting higher numerologies when a position of the UE is close to a network node as compared to UEs which are at an edge of a cell.

11. The UE of claim 10, wherein the processor is configured to receive a value of the timing advance of the UE measured by a network node.

12. The UE of claim 11, wherein the processor is configured to determine the numerology and slot structure corresponding to the received timing advance value, from a pre-configured table.

13. The UE of claim 12, wherein the processor is configured to select higher numerologies for smaller timing advance values so that a symbol size is decreased.

14. The UE of claim 12, wherein the processor is configured to select higher numerologies when a position of the UE is close to a network node as compared to UEs that are at an edge of a cell.

15. The UE of claim 12, wherein the processor is configured to select the numerology and slot structure that optimize one of a latency requirement for data transmission and a throughput for data transmission.

16. The UE of claim 15, wherein the processor is configured to select a slot structure having a subframe that has a duration which is shorter than a duration of a current subframe.

17. The UE of claim 15, wherein the processor is configured to select a slot structure that has a number of symbols for a guard period which is minimized.

18. The UE of claim 10, wherein the slot structure comprises a first number of symbols for a downlink transmission, a second number of symbols for a guard period and a third number of symbols for an uplink transmission.

19. The UE of claim 10, wherein the timing advance is associated with a position of the UE.

* * * * *